UNITED STATES PATENT OFFICE.

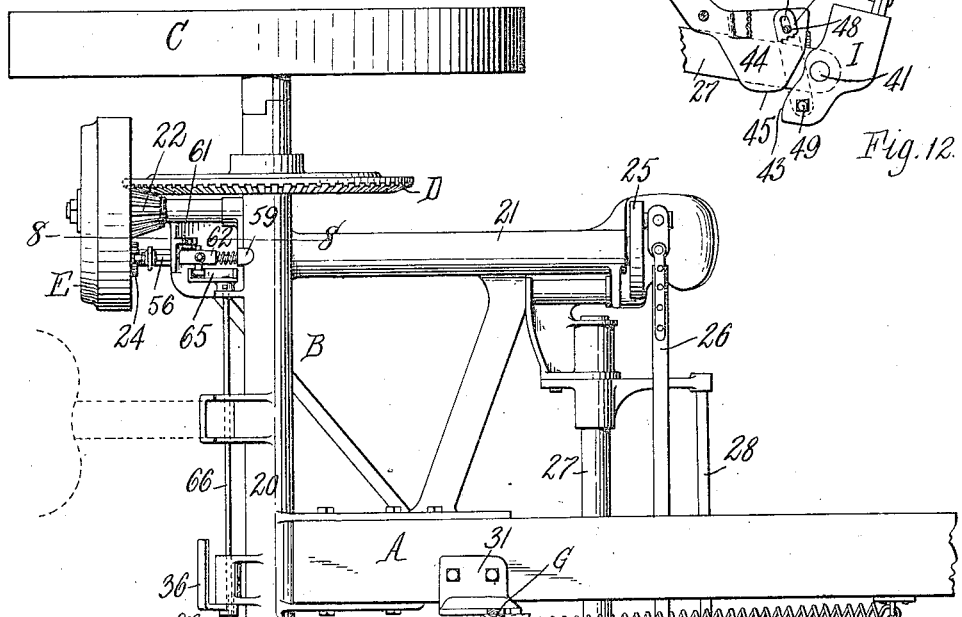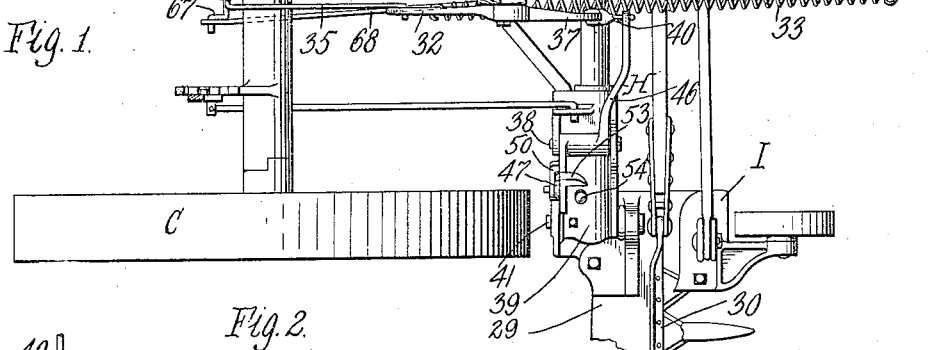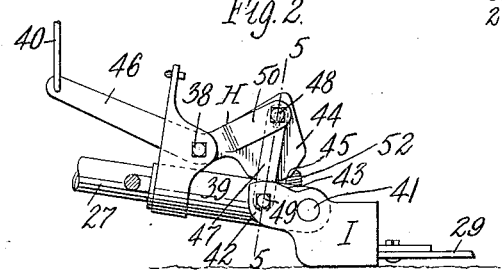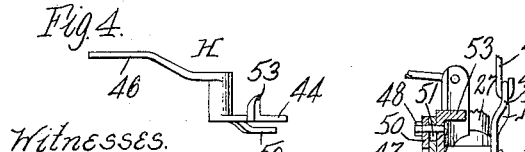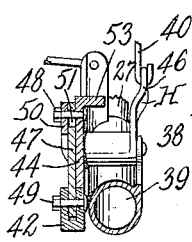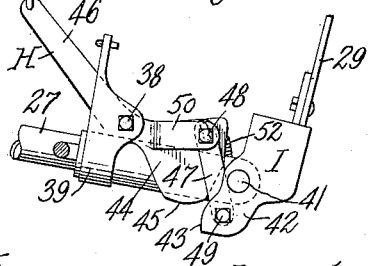

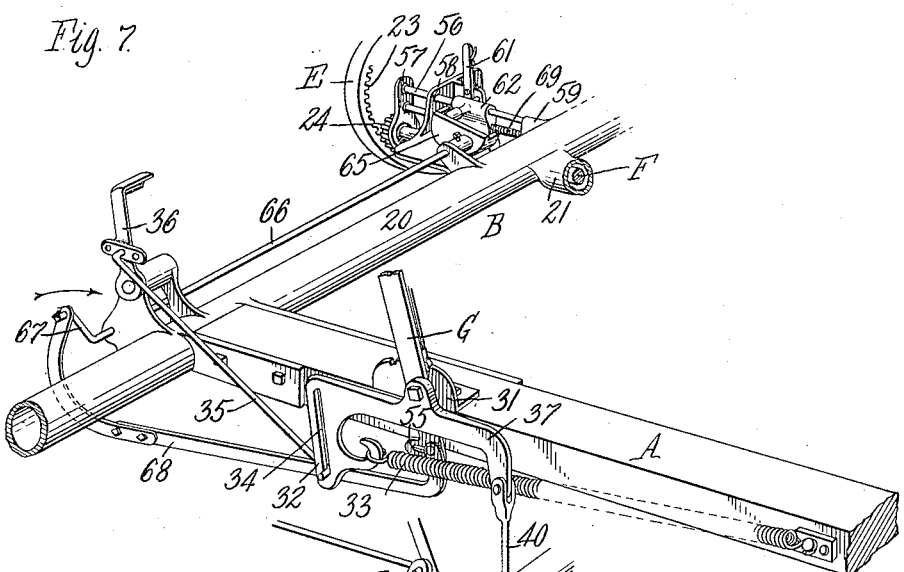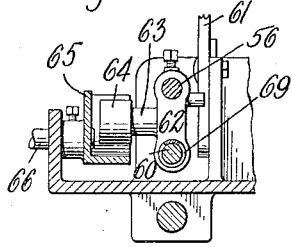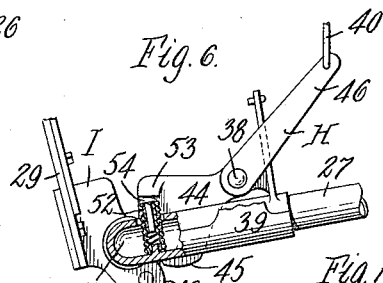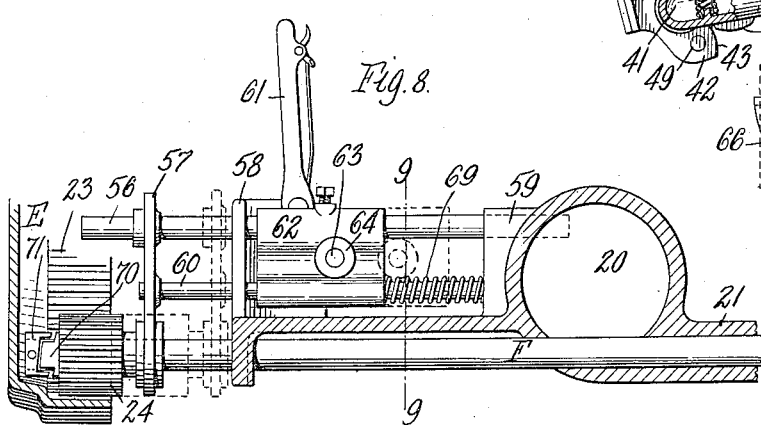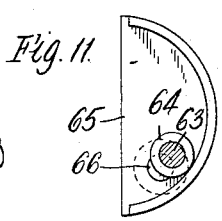

JOSEPH NICHT, OF POUGHKEEPSIE, NEW YORK, ASSIGNOR TO ADRIANCE, PLATT & COMPANY, OF POUGHKEEPSIE, NEW YORK.

MOWING-MACHINE.

1,070,055.  Specification of Letters Patent.  Patented Aug. 12, 1913.

Application filed March 8, 1911. Serial No. 613,160.

*To all whom it may concern:*

Be it known that I, JOSEPH NICHT, a citizen of the United States, residing at Poughkeepsie, in the county of Dutchess and State of New York, have invented a new and useful Improvement in Mowing-Machines, of which the following is a specification.

This invention relates to that class of mowing machines, commonly called "vertical lift mowers," in which the finger bar is so hinged that it can be swung up to an approximately vertical position and in which the driving mechanism of the cutter bar is automatically uncoupled when the finger bar, in being raised, has reached a position beyond which it is undesirable to keep the cutter bar in operation.

The objects of this invention are to provide simple and convenient means for uncoupling said driving mechanism on the rear end of the longitudinal crank shaft; also to provide means for facilitating the movements of the finger bar in raising and lowering the same and preventing a hard shock as the bar reaches its raised position.

In the accompanying drawings, consisting of two sheets: Figure 1 is a top plan view of a mowing machine provided with these improvements. Fig. 2 is a rear elevation of the shoe and the adjacent portions of the coupling frame and finger bar, showing the latter in the horizontal position. Fig. 3 is a similar view, showing the finger bar raised. Fig. 4 is a detached plan view of the gag lever shown in Fig. 2. Fig. 5 is a cross section on line 5—5, Fig. 2. Fig. 6 is a partly sectional front view of the shoe, showing the parts in the position shown in Fig. 3. Fig. 7 is a fragmentary perspective view of those parts of the machine in which the improvements are embodied. Fig. 8 is a longitudinal sectional elevation of the rear portion of the longitudinal driving shaft and connecting parts, on an enlarged scale on line 8—8, Fig. 1, looking stubbleward. Fig. 9 is a vertical section on line 9—9, Fig. 8. Figs. 10 and 11 are grassward views of the uncoupling cam and connecting parts in different positions. Fig. 12 is a fragmentary elevation similar to Fig. 3, showing the link partly in dotted lines.

Like reference characters refer to like parts in the several figures.

A represents the tongue; B the main frame to which the tongue is secured and which comprises a transverse member 20 and a longitudinal member 21; C the ground wheels; D a bevel gear wheel mounted on the stubbleward portion of the axle which is journaled in the transverse frame member 20; E the internal gear wheel which is driven from the wheel D by a bevel pinion 22 formed on or secured to the hub of the internal gear wheel, which latter has an internal gear rim 23; F the longitudinal driving shaft journaled in the longitudinal member 21 of the frame and carrying at its rear end a sliding pinion 24 which meshes with the internal gear face 23 of the wheel E; 25 the crank wheel on the front end of the shaft F; 26 the pitman; 27 the coupling bar; 28 the front transverse member of the coupling frame; 29 the finger bar; and 30 the cutter bar. G represents the hand lever for raising the finger bar; 31 the bracket on the tongue to which this lever is pivoted; 32 the short rear arm of an intermediate lever with which the counterbalancing spring 33 is connected and which has the same pivot as the hand lever and is operated by both the hand lever and the foot lever. The arm 32 is provided with a slot 34 which receives the rod 35 connecting it with the foot lever 36. 37 represents the short front arm of the intermediate lever. All of these parts are of ordinary and well known construction.

H represents the gag lever arranged above the grassward end of the coupling bar 27 and pivoted by a bolt 38 to a casting 39 secured to said bar. The stubbleward end of the gag lever is connected with the arm 37 of the intermediate lever by a rod or link 40.

I represents the shoe to which the inner end of the finger bar is secured and which is pivoted to the casting 39 by a bolt 41. This shoe is provided with an inwardly-projecting slotted or bifurcated arm 42, Figs. 2, 3 and 5, having a cam face 43. The gag lever has its outer arm 44 provided with a cam face 45 which bears upon the cam face 43 during the first portion of the lifting movement of the gag lever, as shown in Fig. 2, and is released from the cam face 43 during the final portion of this movement, as represented in Figs. 3 and 12. When the inner arm 46 of the gag lever is raised, the outer arm 44 is swung down from the position shown in Fig. 2 and this depresses the lifting arm 42 of the shoe and swings the finger bar upwardly.

47 represents a link which connects the outer arm 44 of the gag lever with the lifting arm 42 of the shoe, so that the lever and shoe are movably connected not only by the cam faces 43 and 45 but also by this link, which is connected with the gag lever by a bolt 48 and with the lifter arm of the shoe by a bolt 49. The gag lever is preferably provided on its rear side with a jaw 50, Figs. 2-5, between which and the lever the upper end of the link is arranged and through which the bolt 48 passes, as well as through the lever. The opening 51 in the link through which the bolt 48 passes is elongated, as shown in Figs. 5 and 12, to allow the finger bar to conform to the unevenness of the ground while cutting and to permit the finger bar to be raised to a certain height or angle by the gag lever without affecting the balance of the finger bar. A further movement of the gag lever will bring the link into action, the cam faces 43 and 45 separate, as shown in Figs. 3 and 12, and the final raising of the finger bar is effected by the link and requires comparatively little power.

52 represents a buffer spring which is mounted on the grassward end of the coupling frame for receiving the impact of the finger bar as the latter reaches its raised position. As most clearly shown in Figs. 6 and 7, this spring is mounted in the casting 39 which is secured to the coupling bar 27, and the outer arm 44 of the gag lever is provided on its front side with a finger or lug 53 which strikes upon this spring when the finger bar has nearly reached the limit of its upward movement, and compresses the same. The spring so receives the impact of the upwardly swinging finger bar and stops the same gradually, thereby avoiding hard shocks, and the spring also assists in starting the lowering movement of the gag lever and finger bar, and in this way prevents the machine being thrown in gear before the finger bar has reached the proper position. The spring is preferably provided in its free upper end with a headed bolt 54 for making contact with the finger 53 of the gag lever.

The hand lever G is provided with a short arm 55, Fig. 7, for uncoupling the driving mechanism of the cutter bar when the finger bar has been raised to the position in which this uncoupling is necessary.

The driving mechanism comprises, as shown in Fig. 8, a clutch member 70 formed on the rear side of the pinion 24, and a clutch member 71 on the rear end of the longitudinal driving shaft F. The pinion 24 is loose on the shaft and remains in mesh with the internal gear rim of the driving wheel in its different positions. It is uncoupled from the driving shaft F in its forward position, in which the clutch member 70 of the pinion is out of engagement with the clutch member 71 on the rear end of the driving shaft. By shifting the pinion backwardly until its clutch member 70 engages the clutch member 71 of the shaft, the shaft is coupled to the driving wheel by means of the pinion, while by shifting the pinion forwardly until the clutch members are disengaged the shaft is uncoupled from the driving wheel. This pinion is shifted by means of a longitudinally movable shipper-bar 56 which engages a shipper head 57 engaging with the hub of the pinion, and is guided in sockets 58 and 59 on the main frame and steadied by a guide rod 60 secured to the head 57. The shipper-bar can be shifted by a hand lever 61, as usual, and is shifted simultaneously with the finger bar by the following mechanism automatically or from the hand lever G by which the finger bar is raised and lowered.

62 represents a cross head which is secured to the shipper-bar 56 and which carries a stud 63, preferably provided with an antifriction roller 64. The latter is engaged by a cam 65 which is secured to the stubbleward end of a transverse rock shaft 66 provided at its opposite end with a crank 67. The rock shaft is arranged in rear of the transverse member 20 of the main frame in which the axle is arranged and is actuated from the hand lever G by a longitudinal rod 68 which has its upturned rear end connected with the crank 67 and its front end connected with the short arm 55 of said lever. This arm is slotted to permit the hand lever to raise the finger bar to a certain extent without uncoupling the driving mechanism, but when this point is passed in raising the finger bar the further movement of the hand lever causes the uncoupling to take place. The further rearward movement of the upper arm of the hand lever G then moves the rod 68 forwardly, thereby rocking the shaft 66 in the direction of the arrows, Figs. 7 and 10, and this causes the cam 65 to turn upwardly and forwardly to the position shown in Fig. 11, thereby shifting the driving pinion 24 forwardly, as indicated by dotted lines in Fig. 8, and disengaging the clutch. The movement of the hand lever G in the opposite direction in lowering the finger bar returns the rock shaft 66 and cam 65 to the former position. A spring 69 arranged on the guide rod 60 and bearing against the cross head 62 causes the stud 63 to follow the cam during this return movement and returns the pinion 24 to the coupled position.

I claim as my invention:

1. The combination with a finger bar and a gag lever having engaging cam faces for raising and lowering the finger bar, of a link connecting said lever and bar, substantially as set forth.

2. The combination with a finger bar having an inwardly extending arm provided with a cam face and a gag lever having its outer arm provided with a cam face which engages said face on the arm of the finger bar, of a link connecting the outer arm of the gag lever with the arm of the finger bar, substantially as set forth.

3. The combination with a finger bar having an inwardly extending arm provided with a cam face and a gag lever having its outer arm provided with a cam face which engages said face on the arm of the finger bar during the initial portion of the lifting movement of the finger bar and releases the same during the final portion of said movement, of a link connecting the outer arm of the gag lever with the arm of the finger bar, substantially as set forth.

4. In a mowing machine, the combination of a coupling frame, a cutter mechanism comprising a finger bar pivoted to said frame and capable of being raised and lowered, mechanism for throwing the cutter mechanism out of gear as the finger bar is raised and into gear as that bar is lowered, and a buffer spring arranged on said frame and receiving the impact of the finger bar in raising the latter and assisting in lowering the finger bar, substantially as set forth.

5. In a mowing machine, the combination of a supporting frame, a finger bar pivoted thereto and capable of being raised and lowered, a gag lever arranged on said frame and connected with said finger bar, and a buffer spring arranged on said frame to receive the impact of the finger bar in raising the latter by engaging the gag lever, substantially as set forth.

6. In a mowing machine, the combination of a supporting frame, a finger bar pivoted thereto and capable of being raised and lowered, a buffer spring arranged on said frame to receive the impact of the finger bar in raising the latter, and a gag lever arranged on said frame and provided with a lug for engaging said spring, substantially as set forth.

7. In a mowing machine, the combination of a supporting frame, a finger bar pivoted thereto and capable of being raised and lowered, a buffer spring arranged on said frame to receive the impact of the finger bar in raising the latter, a gag lever arranged on said frame and adapted to engage said spring, and a link connecting said lever and finger bar, substantially as set forth.

8. In a mowing machine, the combination of a supporting frame, a finger bar pivoted thereto and capable of being raised and lowered, a gag lever arranged on said frame and connected with the finger bar, and a buffer spring arranged on said frame adjacent to the grassward arm of the gag lever and adapted to be engaged by the same, substantially as set forth.

Witness my hand in the presence of two subscribing witnesses.

JOSEPH NICHT.

Witnesses:
HARRY C. MYERS,
WEBSTER D. HASBROUCK.

---

Copies of this patent may be obtained for five cents each, by addressing the "Commissioner of Patents, Washington, D. C."